E. S. EVANS.
FLOOR LOADING BUCK.
APPLICATION FILED SEPT. 15, 1921.
1,426,164.
Patented Aug. 15, 1922.
Fig. 1.
Fig. 2.
Fig. 3.
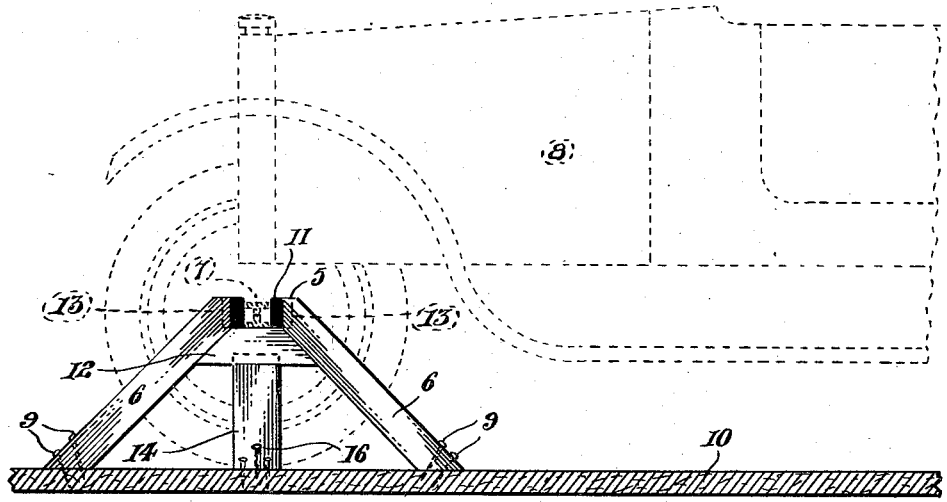
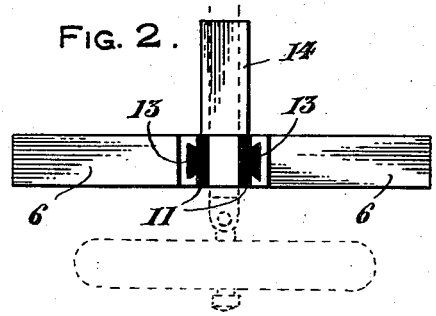
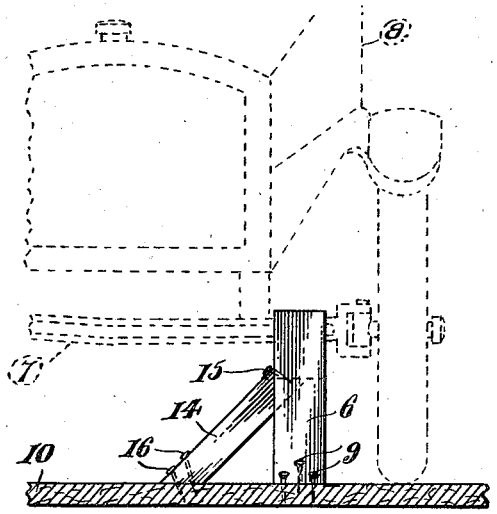
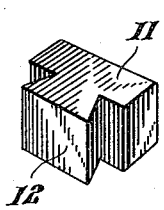
Fig. 4.
Fig. 5.   Fig. 6.
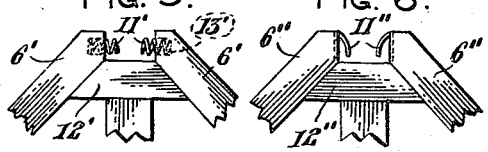
Inventor
E. S. Evans
By F. R. Bryant
Attorney

UNITED STATES PATENT OFFICE.

EDWARD S. EVANS, OF DETROIT, MICHIGAN.

FLOOR LOADING BUCK.

1,426,164.  Specification of Letters Patent.  Patented Aug. 15, 1922.

Application filed September 15, 1921. Serial No. 500,829.

*To all whom it may concern:*

Be it known that I, EDWARD S. EVANS, a citizen of the United States of America, residing at Detroit, in the county of Wayne and State of Michigan, have invented certain new and useful Improvements in Floor Loading Bucks, of which the following is a specification.

This invention relates to certain new and useful improvements in automobile floor loading bucks particularly adapted for holding automobiles against undue forward and backward thrusts or movement relative to the floors of freight cars on which the automobiles are loaded for shipment.

The primary object of the present invention is to provide a buck of the above character which may be cheaply manufactured by reason of its simplicity of construction and which will efficiently serve the purpose for which it is intended.

Prior bucks for floor loading of automobiles in freight cars have been of quite rigid construction, and by reason thereof, the same have repeatedly caused the shearing of the spring bolts and spring clips and the bending of the reach rods of the automobiles, due to the unyielding nature of the bucks, directly transmitting to the automobiles the stresses and strains of the freight cars, in transit. A further object of the present invention, accordingly, is to provide a buck of the present kind which embodies resilient or yieldable means to permit limited cushioned forward or backward movements of the automobile to such an extent as to substantially overcome these disadvantages.

With the above general objects in view and others that will appear as the nature of the invention is better understood, the same consists of the novel form, combination and arrangement of parts hereinafter more fully described, shown in the accompanying drawing and claimed.

In the drawing, wherein like reference characters designate corresponding parts throughout the several views, Figure 1 is a side elevational view of the forward portion of an automobile and a loading buck constructed in accordance with the present invention operatively associated with the front axle of the automobile, Figure 2 is a top plan view of the device shown in Fig. 1, Figure 3 is a front elevational view thereof, Figure 4 is an enlarged perspective view of one of the cushion blocks preferably employed, Figure 5 is a fragmentary side elevational view of a loading buck equipped with a modified form of cushion element, and Figure 6 is a view similar to Figure 5 of a buck equipped with a still further modified form of cushion element.

Referring more in detail to the several views, the present invention consists of a buck including a stirrup portion generally denoted by the numeral 5 and having means 6 for supporting the same in position to engage the opposite sides of the axle 7 of an automobile 8 to hold the latter against undue forward and backward thrusts or movements when said supporting means 6 is secured as at 9 to the floor 10 of a freight car, yieldable means being provided as at 11 to engage the opposite sides of the axle 7 in the stirrup 5 for permitting limited backward and forward movements of the automobile under cushion so as to greatly relieve strains upon the automobile parts upon occurrence of jerks or jars of the freight car.

In the preferred embodiment of the invention as shown the supporting means 6 comprises a pair of upwardly converging legs which may be formed of wood with their upper ends rigidly connected in proper spaced relation by means of a transverse brace 12 so that the upper ends of the legs and the brace 12 form the stirrup 5. The lower ends of the legs are cut at an angle so as to flatly rest upon the floor 10 so as to be properly secured by means of the fastening means 9 which may constitute nails or the like. The cushion means 11 preferably consists of blocks of rubber or the like having dove-tail tongues 12 arranged to be snugly received within similar grooves 13 in the adjacent sides of the upper ends of the supporting legs whereby said blocks are held in place. Any additional means may be provided such as glue or metallic fasteners for securing the blocks 11 in place if found necessary.

In the loading of automobiles with bucks of the present character, two of said bucks are preferably associated with the front axle of each automobile, one being arranged adjacent each steering knuckle inwardly of the latter as shown in Fig. 3, and an inclined leg 14 is preferably provided at the inner side of the buck to be nailed as at 15 at its upper end to the brace 12 and as at 16 at its lower end to the floor 10 whereby said bucks are effectively supported against transverse strains with the lower end of the leg 14 in spaced relation to the supporting legs 6 of the buck.

In the use of the present invention, the parts may be cut in the required form and the parts of the same assembled after the automobile is properly positioned upon the floor 10, although this is not absolutely necessary because of the fact that the axle 7 may be raised sufficiently to clear the upper ends of the legs 6 and then allowed to drop into the stirrup 5.

It is believed that the construction and operation as well as the advantages of the present invention will be fully understood and appreciated by those skilled in the art.

Minor changes may be made therein without departing from the spirit and scope thereof as claimed.

As shown in Figure 5, the cushion elements or means may consist in short helical springs disposed in spaced end to end relation and suitably held in sockets provided in the upper ends of the legs 6', the springs being denoted by the numeral 11' and their sockets by the numeral 13'.

In Figure 6, the upper ends of the legs 6'' are connected by a cross piece 12'' and resilient sheet metal springs 11'' are suitably fastened in grooves or otherwise between the projecting upper portions of said legs to engage opposite sides of an automobile axle.

What is claimed as new is:—

1. A floor loading buck for holding an automobile against undue forward or backward movement when being shipped in a freight car comprising a stirrup adapted to receive an axle of the automobile, means to support said stirrup from the floor of the freight car in a position to engage said axle, said supporting means being adapted to be secured to said floor, and means carried by the stirrup in position to engage opposite sides of the axle to yieldingly allow limited forward or backward shifting of the automobile held thereby.

2. A floor loading buck for holding an automobile against undue forward or backward movement when being shipped in a freight car comprising a pair of upwardly converging legs having a stirrup at the upward ends of the same adapted to receive an axle of the automobile and adapted to have their lower ends secured to the floor of the freight car, and means carried by said stirrup in position to engage opposite sides of the axle for yieldingly permitting limited forward or backward shifting of the automobile.

3. A floor loading buck for holding an automobile against undue forward or backward movement when being shipped in a freight car comprising a pair of upwardly converging legs having a stirrup at the upward ends of the same adapted to receive an axle of the automobile and adapted to have their lower ends secured to the floor of the freight car, and means carried by said stirrup in position to engage opposite sides of the axle for yieldingly permitting limited forward or backward shifting of the automobile, said last named means including cushion elements secured to opposite sides of the stirrup.

4. A floor loading buck for holding an automobile against undue forward or backward movements when being shipped in a freight car comprising a pair of upwardly converging legs adapted to have their lower ends secured to the floor of the freight car, a brace beyond which the upper ends of said legs project and by means of which the upper portions of the legs are rigidly connected in spaced relation to form a stirrup adapted to receive an axle of the automobile, and cushion elements carried by the projecting upper end portions of said legs arranged to engage opposite sides of said axle to yieldingly permit limited forward or backward shifting of the automobile.

5. A floor loading buck for holding an automobile against undue forward or backward movements when being shipped in a freight car comprising a pair of upwardly converging legs adapted to have their lower ends secured to the floor of the freight car, a brace beyond which the upper ends of said legs project and by means of which the upper portions of the legs are rigidly connected in spaced relation to form a stirrup adapted to receive an axle of the automobile, cushion elements carried by the projecting upper end portions of said legs arranged to engage opposite sides of said axle to yieldingly permit limited forward or backward shifting of the automobile, said upper ends of the legs being provided with vertical dove-tail grooves in their adjacent faces which form the sides of the stirrup, and said cushion elements including resilient blocks having dove-tail tongues snugly fitted in said grooves.

In testimony whereof I affix my signature.

EDWARD S. EVANS.